United States Patent [19]
Mualem

[11] Patent Number: 5,930,904
[45] Date of Patent: Aug. 3, 1999

[54] CATENARY SYSTEM MEASUREMENT APPARATUS AND METHOD

[76] Inventor: Charles Mualem, P.O. Box 133, Ririe, Id. 83443

[21] Appl. No.: 08/877,315

[22] Filed: Jun. 17, 1997

[51] Int. Cl.$^6$ .................................................. E01B 29/04
[52] U.S. Cl. ............................. 33/1 Q; 33/281; 33/651.1
[58] Field of Search ............................. 33/281, 282, 286, 33/546, 1 Q, 651, 651.1

[56] References Cited

U.S. PATENT DOCUMENTS

| | | |
|---|---|---|
| 3,267,794 | 8/1966 | Howe ........................................ 33/651 |
| 3,604,117 | 9/1971 | Von Beckmann . |
| 3,675,233 | 7/1972 | Bencsics et al. . |
| 3,750,299 | 8/1973 | Plasser et al. . |
| 3,795,056 | 3/1974 | Plasser et al. . |
| 3,922,969 | 12/1975 | Tyler et al. . |
| 3,970,391 | 7/1976 | Johnson et al. . |
| 4,535,699 | 8/1985 | Bühler . |
| 4,709,485 | 12/1987 | Bowman . |
| 4,724,653 | 2/1988 | Buhler . |
| 5,157,840 | 10/1992 | Henttinen . |
| 5,161,312 | 11/1992 | Theurer ..................................... 33/651 |
| 5,331,745 | 7/1994 | Jager . |
| 5,644,850 | 7/1997 | Costales ................................... 33/282 |

FOREIGN PATENT DOCUMENTS 2281125  2/1995  United Kingdom .

OTHER PUBLICATIONS

SupaRule™ System Ltd. "Cable Height Meter", ©1993, AVO International, 2 pages.
SupaRule© System Ltd. "Railways Overhead Measurement", 4 pages.

Primary Examiner—Bernard Roskoski
Attorney, Agent, or Firm—Synnestvedt & Lechner

[57] ABSTRACT

Apparatus and method for measuring height and stagger of a railway catenary is disclosed. The apparatus comprises a platform supported on the track having a distance measuring means mounted on a traversing means for angular or lateral displacement of the distance measuring means in a vertical plane transverse and perpendicular to the track. The apparatus has a means for measuring the displacement of the measuring means. The method comprises positioning the platform on the track beneath the catenary, traversing the distance measuring means through a displacement into an alignment along a line of sight with the catenary, measuring the distance to the catenary, measuring the displacement of the distance measuring means, and calculating the height and stagger from the distance and displacement measurements.

35 Claims, 9 Drawing Sheets

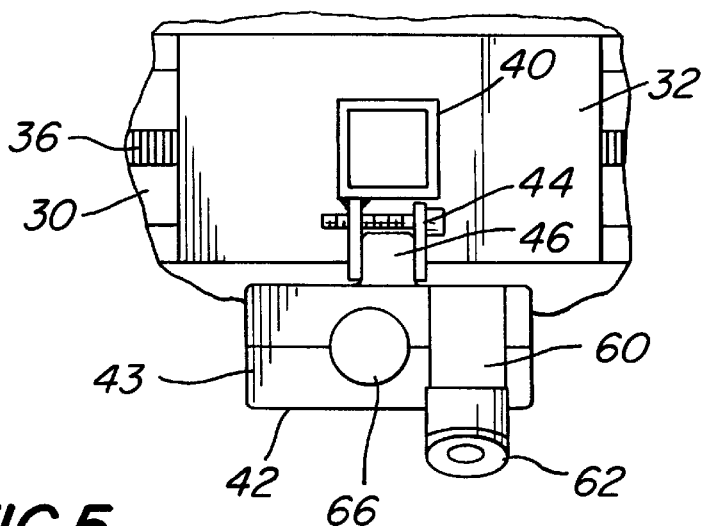
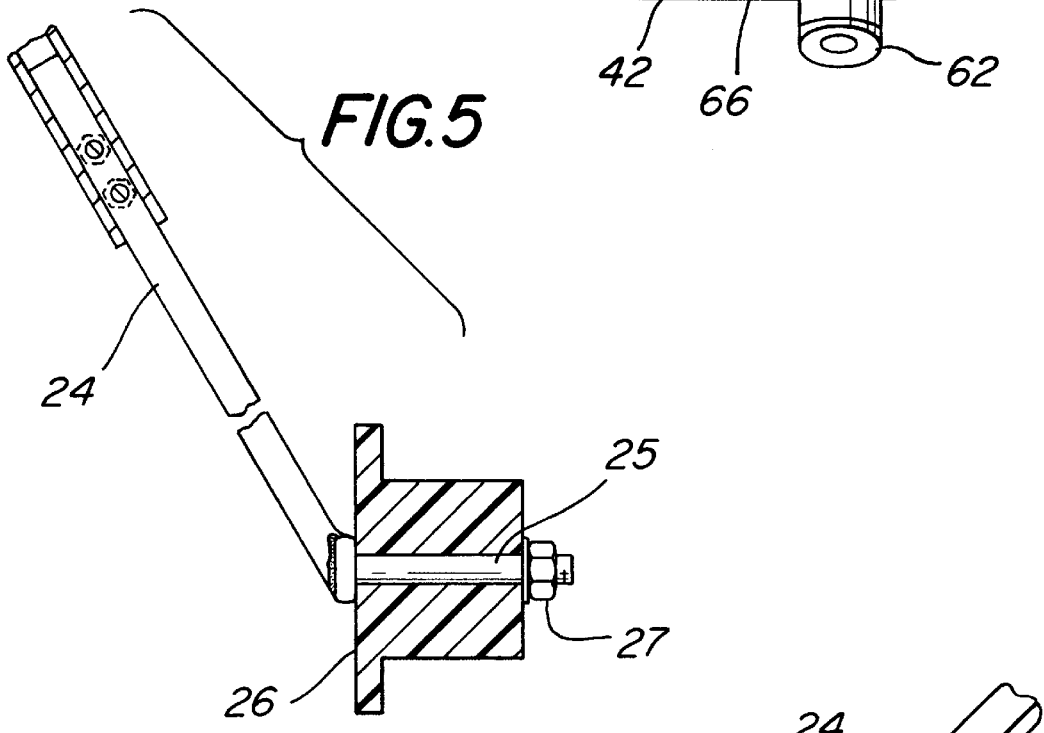
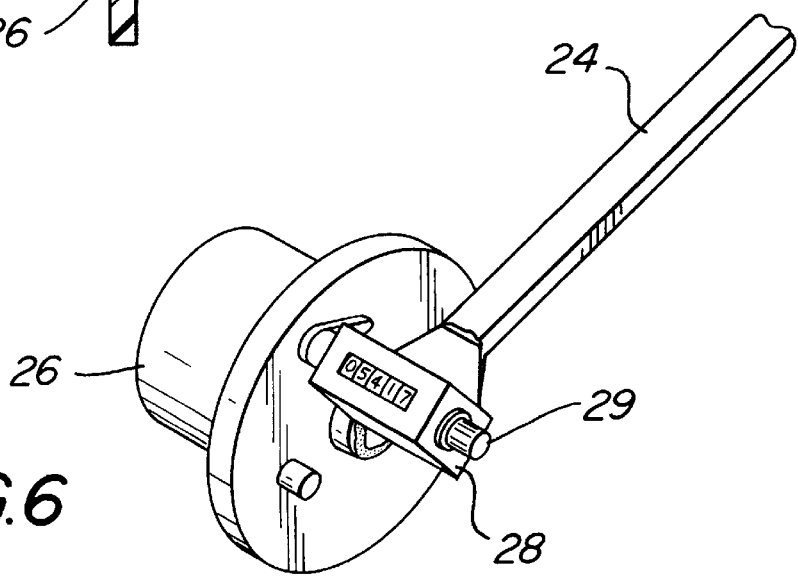

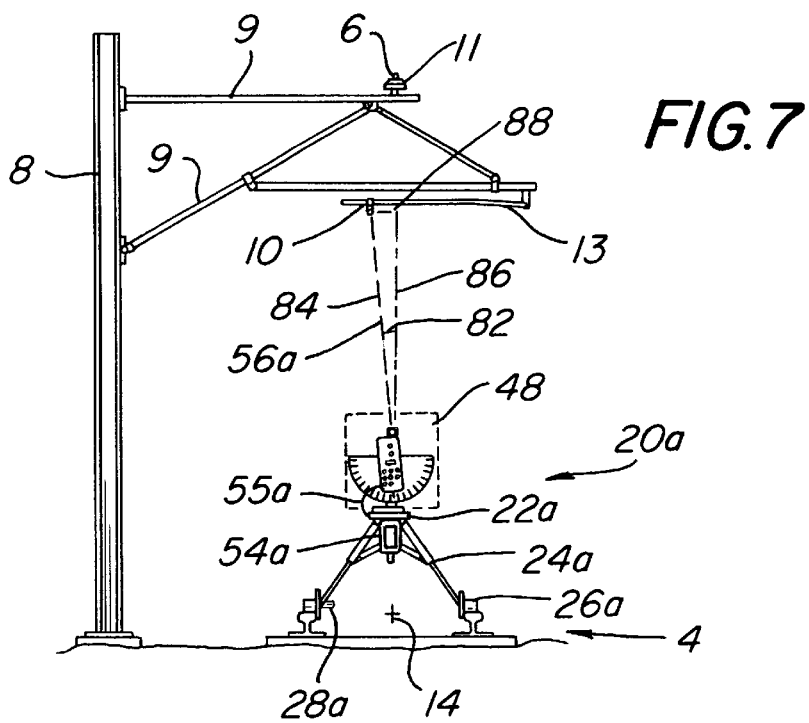
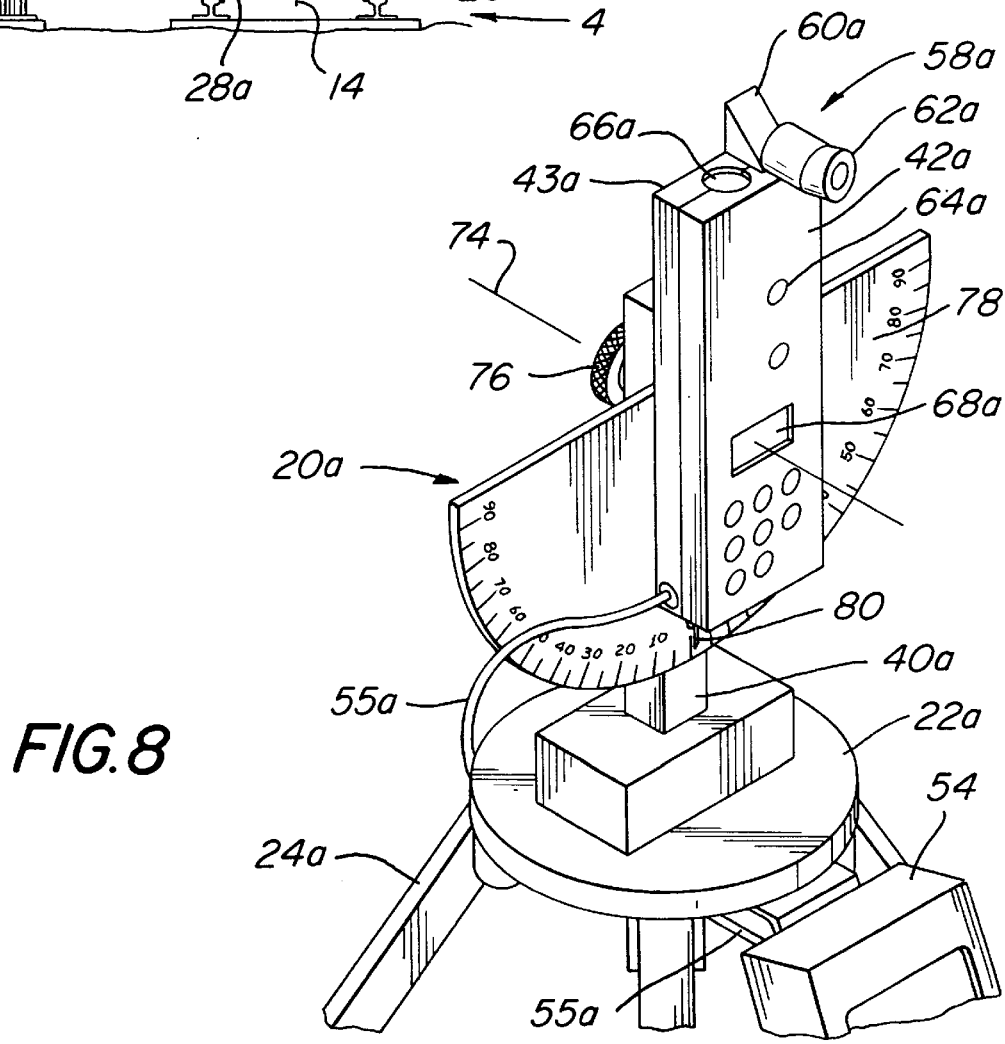

CATENARY SYSTEM MEASUREMENT APPARATUS AND METHOD

FIELD OF THE INVENTION

This invention relaes to an apparatus and a method for measuring the height and stagger of a catenary system disposed above a railway track.

BACKGROUND OF THE INVENTION

A convenient method for delivering electrical power to electrically powered trains is by means of an overhead catenary system suspended above the track between support columns or other supporting structures spaced along the track. A typical catenary system, referred to hereinafter simply as a catenary, comprises a contact wire suspended on hanger elements (usually bronze rods) from a messenger wire which is attached to the support columns. The contact wire is maintained at a high electrical potential and supplies electrical current to power the train. The train has an electrical pick-up structure or pantograph mounted on its roof. The pantograph typically comprises an elongated beam mounted transversely to the direction of travel and has a contact surface for engaging the contact wire of the catenary. The pantograph is in substantially continuous contact with the contact wire as the train travels along the track. The contact wire is suspended substantially parallel to the track while the messenger wire traces a curve, known as a catenary, between the support columns. A catenary curve is defined as the curve assumed by a flexible cord or chain of uniform density which hangs freely from two fixed points and approximates a parabola. Although the messenger wire curves under the pull of gravity the contact wire is maintained parallel to the track by varying the length of the hangers which suspend the contact wire from the messenger wire. An analogous catenary system can be observed in the structure of a suspension bridge, the main support cables assuming a catenary shape between the support towers while the bridge deck is suspended substantially level between the towers.

The position of the catenary above the track must be carefully controlled and maintained to ensure continuous contact between the pantograph and the contact wire for the continuous delivery of electrical power to the train. Not only must there be substantially continuous contact, the point of contact on the pantograph must be continuously varied along the length of the pantograph as the train moves along the track to prevent excessive frictional wear at any one point on the pantograph. Thus both the vertical and horizontal positions of the contact wire relative to the pantograph are important to the efficient functioning of the train.

Control of the vertical position ensures that the proper contact pressure is maintained. If the wire is too low contact pressures may be excessive causing excessive frictional wear of the wire and pantograph. The contact wire could also become snared on a part of the train beneath the pantograph, bringing down the catenary and electrocuting passengers or bystanders. If the wire is too high, the pantograph may tend to lose contact with the wire depriving the train of power and stranding the train. If the contact is intermittent the train will be subject to power surges yielding an uncomfortable ride and potentially damaging the equipment.

Controlling the horizontal position of the catenary relative to the pantograph keeps the contact wire from laterally disengaging from the pantograph as the train moves down the track. The horizontal position of the catenary must be maintained so as not to extend laterally left or right of the train beyond the physical extent of the pantograph. However, the catenary must not contact the pantograph continuously in one spot. If the system were designed to maintain contact at one spot on the pantograph, then the pantograph would rapidly wear out due to the friction between the contact wire and the pantograph, the wire would literally saw through the pantograph. To avoid this problem it has been found advantageous to arrange the catenary above the track in a zig-zag manner about the track centerline. The contact point between the wire and the pantograph is thus varied along the length of the pantograph as the train moves down the track, and the contact surface of the pantograph is subjected to even wear. The zig-zag pattern is carefully controlled however to ensure that the contact wire remains laterally within the bounds of the pantograph.

Maintaining the vertical and horizontal position of the catenary relative to the pantograph requires the capability to measure two parameters of the catenary relative to a plurality of predetermined reference points fixed at a plurality of predetermined locations along the track. For convenience the centerline of the track at the top of the rails is often used as the reference point at each predetermined location along the track where measurements are taken. The two parameters measured are termed the height and stagger of the catenary.

Height, when used in this context, refers to the perpendicular distance between a plane parallel to the track through the reference point and the contact wire of the catenary at the predetermined location along the track. Thus, for level track, the height will simply be the vertical distance between the reference point and the contact wire. If the track is banked, as would be done for curved track, the height will not be the vertical distance but will be measured at an angle to the vertical corresponding to the bank angle. Height is thus always measured perpendicularly to the plane of the track regardless of the angle the track makes with the horizontal.

Stagger, when used in the context of this invention, refers to the lateral offset of the catenary from the track centerline as measured perpendicularly to the height. For example, on level track, the stagger is the horizontal distance of the contact wire from the track centerline. Height and stagger always form a right angle, and a right triangle is formed by the height, stagger and the line of sight (LOS) distance from the reference point to the contact wire. Height and stagger are related to the line of sight distance analogously to the legs of a right triangle to the hypotenuse by the trigonometric functions of cosine and sine respectively.

Current Methods of Measuring Height and Stagger

Despite the importance of height and stagger measurements to the maintenance of the catenary and the efficient operation of electrically powered trains, there exists no efficient, convenient, reliable and accurate apparatus or method for making such measurements. Two methods for measuring height and stagger and their associated apparatus are described in detail below to provide a basis for comparison with the invention.

One method for measuring height and stagger at a predetermined location along a railway track comprises manual height measurements made with an electrically insulated extension pole and stagger measurements made with a mirror gauge.

In measuring catenary height, the pole is held vertically by an operator beneath the catenary and extended until the contact wire is contacted by the pole. The pole is graduated and the distance to the wire is measured by reading the pole markings.

The mirror gage used to measure stagger comprises a graduated beam which spans between the two rails of the track. A mirror is slidably mounted on the beam with its reflecting surface oriented perpendicularly to the track and at a 45° angle to the horizontal. In this configuration, the mirror reflects images of objects above the track which are viewed by the operator when standing on the track and facing down the length of the track. A vertically projecting finger is also slidably mounted on the beam and moves along the beam in conjunction with the mirror. The finger serves as a reference with which to align the image of the catenary as reflected in the mirror. The mirror and finger are moved transversely on the beam until the image of the catenary wire as reflected in the mirror is coincident with the finger. The mirror and finger are then exactly below the catenary and the distance of the mirror and finger from the track centerline can be measured on the graduated beam to yield the stagger.

Several disadvantages are immediately apparent with the manual methods of measuring height and stagger. Safety is compromised when the pole is close to or in contact with wires carrying typically 13,000 volts. Such measurements cannot be made in the rain or snow due to the risk of electrocution of the operators. The height to which such measurements can be made is limited by the height of the pole. High wind conditions can prevent height measurements from being taken. Two operators are required, one to hold and align the pole, the other to take and record the measurements. The manual method is thus subject to human error. The data gathered must later be evaluated by hand or entered into a computer, providing yet another opportunity for human error to corrupt the data. When using the mirror gage for stagger measurements it is difficult to discern which wire is being measured if there are several wires in view overhead. Human error can also be introduced when aligning the image of the wire in the mirror with the finger.

A second method of measuring the height and stagger of a catenary uses a SONAR device which is positioned on the rails beneath the catenary. The SONAR device is described in UK Patent Application GB 2,281,124 A. The device emits sound pulses which reflect from the wire overhead and are sensed by the device. The device calculates the distance to the wires from the known speed of sound in air and the time between emission and echo return of the sonic pulse. Height and stagger are measured by a triangulation method using two ultrasonic emitter/sensor pairs which emit and receive a series of precisely timed pulses in a fixed pattern from which the number of overhead wires and their relative geometrical relationship can be deduced as a function of their temporal relationships. The measurements can be made to a range of 7 meters with 10 mm accuracy. The data is recorded and stored in the device and can be downloaded to a computer.

The SONAR based method, despite its apparent technological advancement over the manual method, has not replaced the manual method for the following reasons:

1. operators find the device temperamental and difficult to use;
2. the range of the device is limited;
3. the device has difficulty resolving and distinguishing multiple targets, such as closely spaced wires, and cannot measure a smaller reflecting target, such as a wire, if a larger reflecting target, such as a structural I-beam, is above or behind the wire; and
4. ambient noise from traffic or a nearby factory, for example, can saturate the device's sensors rendering the device unusable in a noisy environment.

SUMMARY AND OBJECTS OF THE INVENTION

Description of the Apparatus

The apparatus comprises a platform supported on the track and a rangefinding means for measuring distance to an object such as the catenary. The rangefinding means is mounted on the platform via a traversing means which permits the rangefinding means to be traversed relatively to the platform in a vertically oriented plane extending transversely and perpendicularly of the track. The term traverse is meant to describe a lateral crossing movement or a lateral pivoting movement of the rangefinding means relative to the platform. The invention further comprises a means for measuring the displacement of the rangefinding means as it traverses within the vertically oriented plane.

In a first embodiment of the apparatus, the rangefinding means comprises a laser rangefinder which measures the distance to a remote object by projecting a laser beam at the object and detecting the reflection of the beam from the object. The period between the time the beam is projected and the reflected beam is detected is measured by the rangefinder and the distance is calculated by the rangefinder from the time period and the known constant speed of light.

The rangefinder is mounted on the traversing means which comprises a translational bearing mounted on the platform. The translational bearing is preferably an elongated guide beam mounted on the platform transverse to the track with a crosshead slidably engaging the beam for lateral motion transverse to the track. The rangefinder is mounted on the crosshead and oriented to project its beam normal to the plane of the track. A graduated scale mounted on the platform adjacent and parallel to the guide beam provides a means for measuring the lateral displacement of the crosshead relatively to the platform, although other, more sophisticated means of measuring the lateral displacement of the crosshead could also be employed. For example, a transducer means could be used which produces an analog signal in proportion to the lateral movement of the crosshead. The signal could then be converted from an analog to a digital signal and recorded and displayed via a computer.

In a second embodiment of the apparatus, the laser rangefinder is mounted on a rotational bearing having an axis of rotation oriented substantially horizontal and parallel to the track. The rangefinder is mounted on the rotational bearing so as to project its beam radially from the axis. A bearing support structure is provided to house the rotational bearing and mount the bearing on the platform. The rotational bearing could be for example a simple trunnion and journal housing as used to mount a telescope for elevational motion.

Upon rotation of the rangefinder on the rotational bearing the beam of the rangefinder traverses through an angular displacement which cuts perpendicularly across the catenary. A means for measuring the angular displacement is provided in the form of a simple protractor scale and a pointer which are mounted on the bearing support structure and rotating bearing element respectively. The scale remains fixed while the pointer rotates with the rangefinder across the face of the protractor to indicate the angular displacement of the rangefinder as it traverses. Alternatively, more sophisticated angular displacement measurement means could be used; for example, a transducer which produces a signal in proportion to the rotational displacement of the rangefinder and means for encoding the signal into digital form for use by a computer or other recording or calculating means.

Description of the Method of Measuring Catenary Height and Stagger

The method of the invention comprises as a first step positioning the apparatus at a predetermined position relatively to a predetermined reference point at a predetermined location along the track. For convenience the predetermined reference point is typically taken as the track centerline at the top of the rails. It is desired to know the catenary height and stagger relative to the reference point, but it is generally difficult to make actual physical measurements exactly from the reference point because the measurement apparatus itself takes up space and is designed for easy use by a person. This problem is overcome by making the measurements from a known predetermined position relative to the reference point and then mathematically correcting or adjusting the actual measurements to account for the difference between the reference point and the relative position of the measuring device.

In the next step, the rangefinding means is traversed to effect a displacement which will bring the rangefinding means into an alignment along a line of sight with the catenary, specifically, the contact wire. In the following step, the distance to the contact wire is measured, and the displacement of the rangefinding means is also measured.

In the final step, the height and stagger of the catenary are calculated using the distance and displacement measurements. The height is proportional to the distance measured and the stagger is proportional to the displacement, as described below.

The method outlined above is employed with the first embodiment of the apparatus described above as follows. The height and stagger measurements are made by first positioning the platform on the track at a predetermined position relative to the predetermined reference point (track centerline, top of rails) at a predetermined location along the track where the catenary height and stagger measurements are desired. Next the laser rangefinder mounted on the crosshead is aligned along a vertical line of sight with the contact wire of the catenary by traversing the crosshead along the guide beam perpendicularly to the track until the laser is directly beneath the contact wire. A laser beam is then projecting from the rangefinder. Light from the beam reflects off the contact wire, the reflection being sensed by the rangefinder which then uses the time period between projecting the beam and sensing the reflection to calculate the distance to the contact wire of the catenary. The distance measured is the height of the catenary above the rangefinder. To get the height above the rail top (the reference point), we must add the perpendicular distance from the rail top to the rangefinder which yields the desired catenary height. Stagger is obtained by measuring the displacement of the rangefinder from the track centerline during the traversal which brought the rangefinder into alignment directly beneath the contact wire. The displacement is easily measured via the graduated scale fixed on the platform parallel to the guide beam.

The method is also employed with the second embodiment of the apparatus. Height and stagger measurements are made by positioning the platform on the track at a predetermined position relative to the predetermined reference point (track centerline, top of rails) at a predetermined location along the track where the catenary height and stagger measurements are desired. The rangefinder is then aligned along a line of sight with the contact wire of the catenary by traversing the rangefinder on the rotational bearing through an angular displacement. The line of sight distance is then measured by projecting the laser beam onto the contact wire and sensing the laser light reflected. The line of sight distance represents the length of the hypotenuse of a right triangle whose legs comprise the height and stagger of the catenary once corrected for the relative position of the measuring device with respect to the reference point. As is well known from trigonometry, if the hypotenuse and the angle between the hypotenuse and a leg of a right triangle are known, the lengths of the legs can be calculated by means of the sine and cosine functions. Using the protractor scale and the pointer, the angle traversed by the rangefinder from the vertical to the line of sight provides a measurement of the required angle, and the height of the catenary above the rangefinder is given by multiplying the hypotenuse by the cosine of the angle. Adding the perpendicular distance from the rangefinder to the reference point gives the desired catenary height. The stagger is calculated by multiplying the hypotenuse by the sine of the angle. If the rangefinder is positioned directly above the track centerline, no further corrections are required. If the rangefinder is offset from the centerline, that offset distance must be added to or subtracted from the calculation to yield the true catenary stagger.

The apparatus and method of the invention can be easily used by a single person to measure the catenary height and stagger at a plurality of points along a predetermined length of track in a survey of the catenary. There are additional features which can be added to the apparatus which make the surveying task easier, more efficient and less error prone.

Flanged wheels engagable with the rails are rotatably mounted on the platform which enable the platform to be easily moved along the track from one predetermined location to another along the track. An odometer is operatively associated with one of the wheels to provide a means for measuring the distance traveled by the apparatus along the track. The odometer is especially useful for correlating height and stagger measurements precisely with position along the track to create a map of the height and stagger as a function of position. Such a map would allow maintenance crews to quickly identify points along the track where the catenary is out of position with the track and then to effect the proper adjustment of the catenary.

It is also advantageous to use the apparatus in cooperation with a portable digital computer. The computer is programmed to accept the measurements made and perform the calculations of height and stagger. The computer can also store the data in a database or a spread sheet for further analysis or for the generation of various graphical depictions of the height and stagger as a function of position along the track. The use of a computer eliminates the potential for human error in the various calculations which are necessary to derive the height and stagger from the measurements.

A further source of human error can also be eliminated by linking the apparatus directly to the computer and transmitting the measurements made directly into computer memory. This is accomplished by using transducers to generate or encode a signal proportional to each measurement being made. The signals are then converted into a digital form which the computer can read and store, and the digital signals are conveyed directly into the computer, for example, over wires linking each transducer to the computer. With such a direct link between the measurement means and the computer the operator need not read the measurements from a scale or dial and enter the measurements into the computer by hand, thus eliminating another source of potential error.

Although the apparatus is designed for measuring height and stagger of a catenary, it can also be used to perform other measurement tasks as well. For example, the device can be used to measure the distance between two points, like the distance between the contact wire and the messenger wire at a point along the track or the distance between two support columns along the track. To perform these additional measurement functions it is advantageous to use the second embodiment and mount the bearing support structure on a rotating bearing having a vertical axis of rotation. This allows the rangefinder to be rotated in azimuth, as well as in elevation, and the laser beam can thus be trained on any target point within range of the laser. To measure the distance between two points horizontally separated, the laser is trained on the first point and the distance is measured from the laser to the point, as described above. The rangefinder is then rotated in azimuth and trained on the second point to which the distance is similarly measured. Knowing the distance to both points from the rangefinder and the included angle between the points (as measured by the azimuthal rotation) the law of sines or cosines can be used to find the distance between the two points. The device can also be analogously used to measure the vertical separation of two points by rotating the rangefinder in elevation. Thus the height of a column could be measured by training the laser beam on the base of the column and measuring the distance form the rangefinder to the base. Next the rangefinder is trained on the top of the column and the distance to it is measured. The elevational displacement of the rangefinder comprises the included angle between the base and the top of the column. Again, knowing the distance to the base and the top of the column from a given point and the included angle between allows the use of the law of sines or cosines to calculate the height of the column, the height representing the unknown length of a third side of a triangle of which the length of two sides and the included angle are known. Of course, the measurement of the distance between two points is not limited to measurements taken only in a horizontal or vertical plane, but distance between any two points in space can be measured by analogizing the law of sines or cosines to three dimensions and making angular displacement measurements in both azimuth and elevation.

It is an object of the invention to provide a method and an apparatus for safely, reliably, conveniently and efficiently measuring catenary height and stagger.

It is an object of the invention to provide a means for measuring catenary height and stagger which requires no physical contact between the catenary and the measuring device.

It is another object of the invention to provide a means for measuring catenary height and stagger accurately over greater distances than currently practiced.

It is yet another object of the invention to provide a means for measuring catenary height and stagger with improved accuracy over the current practice.

It is a further object of the invention to provide a means for measuring catenary height and stagger which reduces the potential for human error affecting the measurements.

It is another object of the invention to provide an apparatus for measuring catenary height and stagger which requires only one person to operate.

It is still another object of the invention to provide a method of measuring catenary height and stagger wherein the data collection and recordation can be automated.

It is still another object of the invention to provide a method of measuring catenary height and stagger at a plurality of locations along a predetermined length of track and an apparatus for making and recording catenary height and stagger at the plurality of predetermined points.

It is yet another object of the invention to provide an apparatus for measuring catenary height and stagger which is portable.

These and other objects will become apparent from a consideration of the following drawings and detailed description of the preferred embodiment of the invention.

BRIEF DESCRIPTION OF THE DRAWINGS

FIG. 4 shows a plan view of a detail of the embodiment of FIG. 1;

FIG. 5 shows an end elevational sectional detail of a flanged wheel and support leg according to the invention;

FIG. 6 shows an isometric detailed view of a flanged wheel and odometer according to the invention;

FIG. 7 shows an end elevational view of a second embodiment of the apparatus according to the invention positioned on a railway track beneath a catenary;

FIG. 8 shows a detailed isometric view of a portion of the second embodiment of FIG. 7;

DETAILED DESCRIPTION OF THE INVENTION

Figure 1:
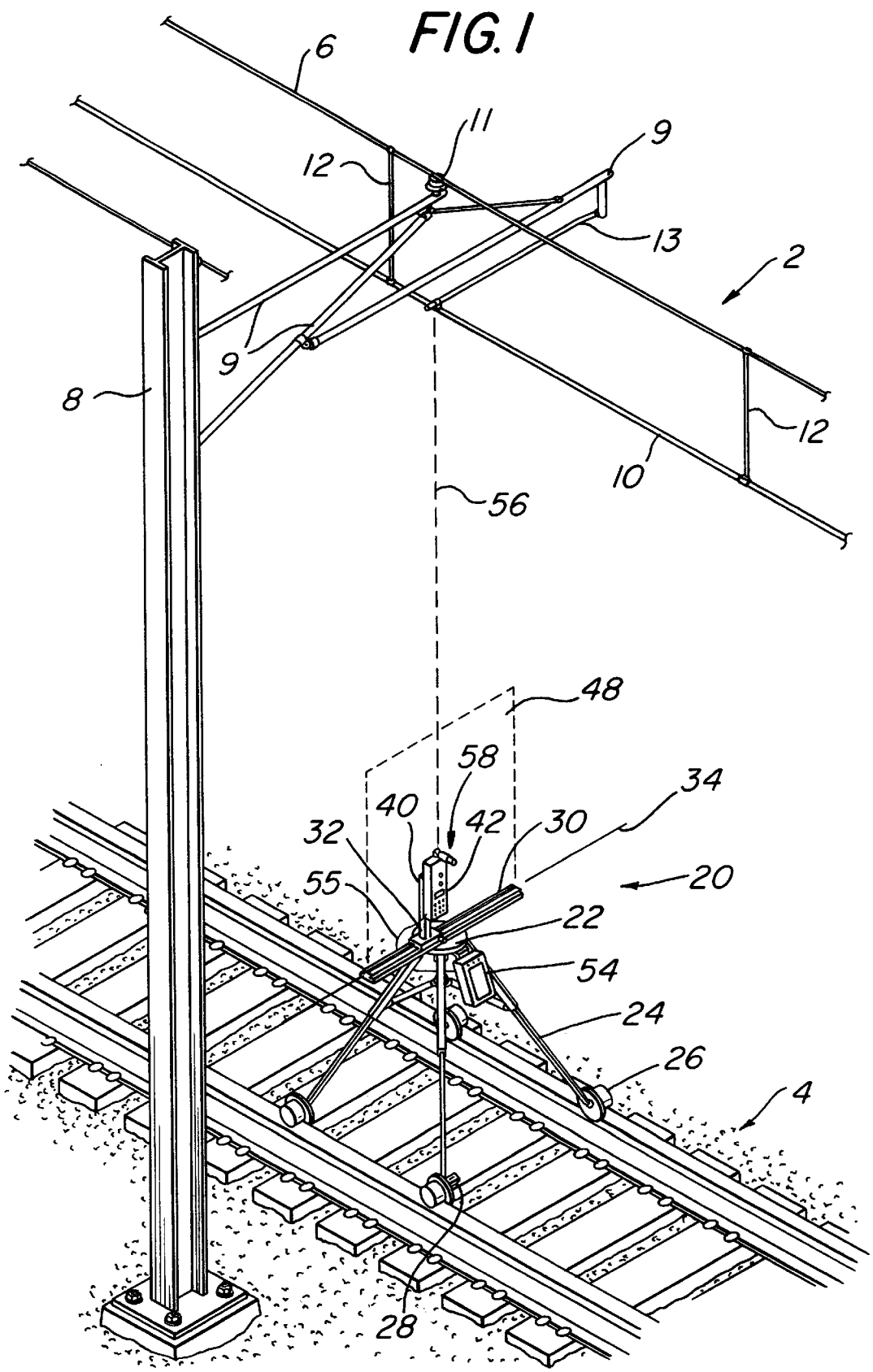
FIG. 1 shows an isometric view of an embodiment of an apparatus according to the invention positioned on a railway track beneath a catenary.
Figure 2:
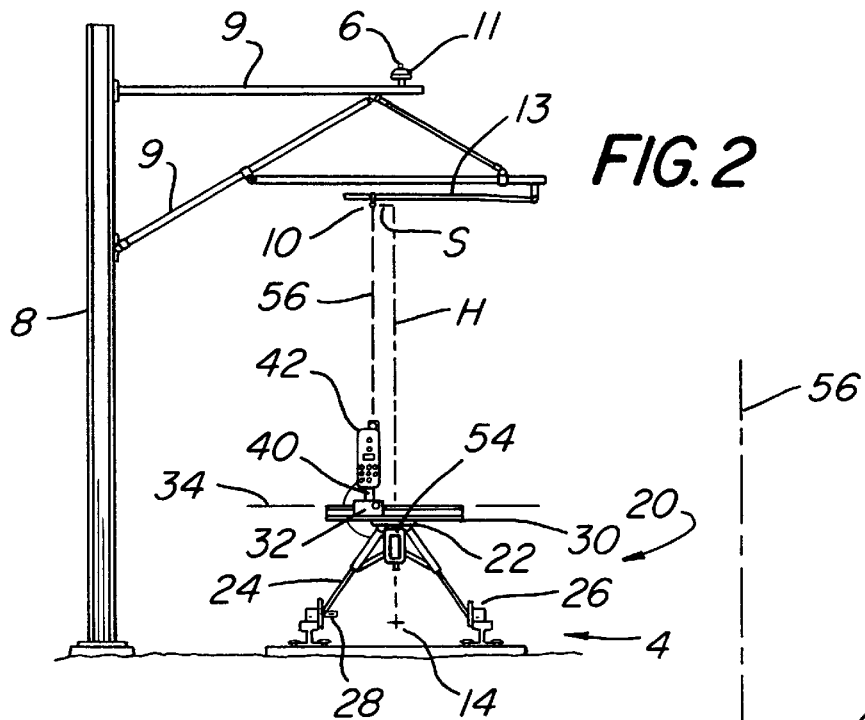
FIG. 2 shows an end elevational view of the embodiment of FIG. 1.

FIGS. 1 and 2 illustrate an embodiment of the apparatus 20 for measuring the height "H" and stagger "S" of a railway catenary 2 above a railway track 4. Catenary 2 includes the messenger wire 6 which is typically supported from a trackside support column 8 and a contact wire 10 suspended from the messenger wire 6 by hanger elements 12. Support column 8 comprises a support truss assembly 9 which supports messenger wire 6 via an insulated attachment standoff 11. An insulated stabilizing bar 13 extends from truss assembly 9 to contact wire 10 to provide stabilizing and positioning support to the contact wire. Messenger wire 6 assumes the curved catenary shape between support columns 8 while the contact wire 10 is suspended parallel to track 4 by varying the length of hanger elements 12 to compensate for the curved profile of the messenger wire. Contact wire 10 is maintained at a high electrical potential and makes contact with a pantograph on a train (not shown) to provide electrical power to the train.

As illustrated in FIG. 2, height H of the catenary 2 is the perpendicular distance from the contact wire 10 to a plane parallel to track 4 through a reference point 14. A preferred reference point location is in the center of the track at the top of the rails as seen at 14 in FIG. 2. Stagger S is the lateral offset of contact wire 10 from the track center and always forms a right angle to the height H, as seen in FIG. 2.

FIGS. 1 and 2 show apparatus 20 comprising a platform 22 supported on track 4 by means of support legs 24 having flanged wheels 26 for engaging track 4. Wheels 26 are rotatably mounted on legs 24 as seen in FIG. 5 by means of axle 25 fixed to leg 24 and retaining nut 27 threadedly attached at the end of axle 25. Flanged wheels 26 allow apparatus 20 to be readily moved along track 4 from one predetermined location to another. An odometer 28, shown to best advantage in FIG. 6, operatively engages one of the wheels 26 and records the distance travelled by apparatus 20 along track 4. Odometer 28 has a resetting knob 29 which is used to reset the odometer reading to zero as desired to provide a convenient reference point from which to measure the distance travelled along track 4.

Figure 3:
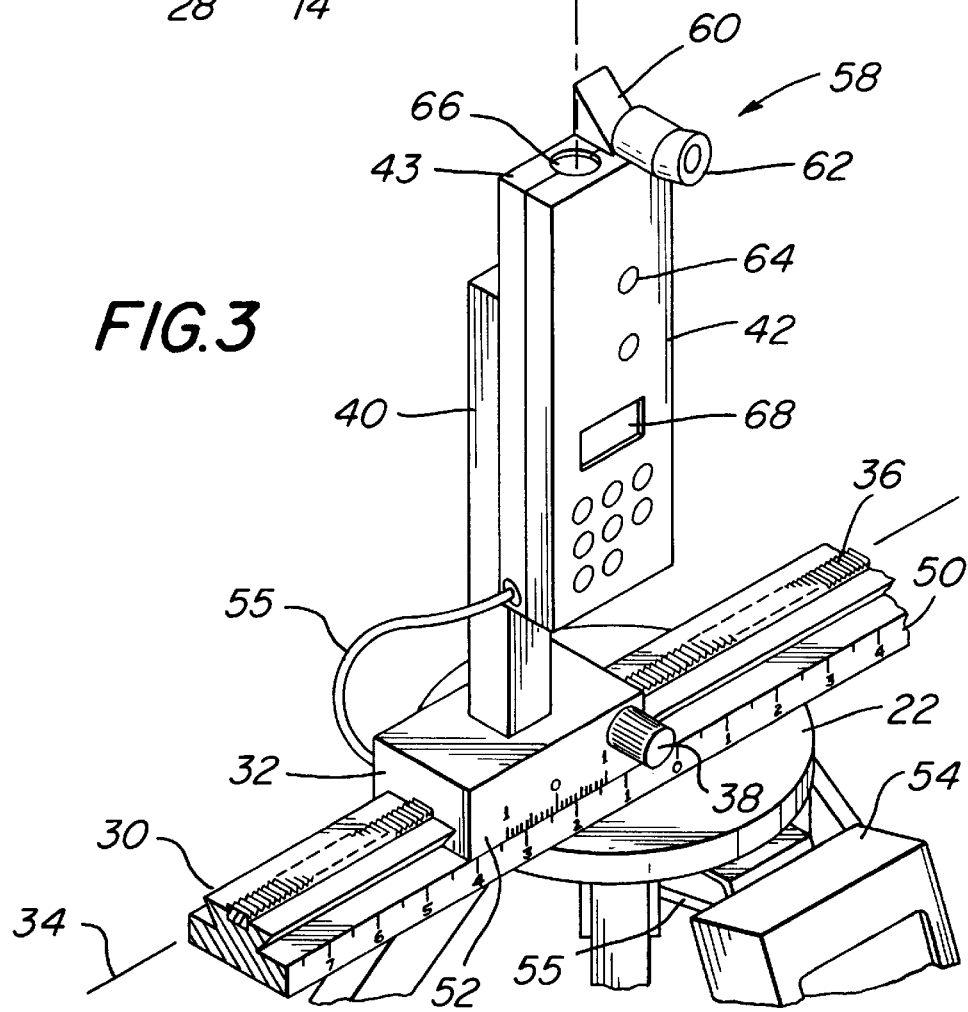
FIG. 3 shows a detailed isometric view of a portion of the embodiment of FIG. 1 on an enlarged scale.

A traversing means is mounted on platform 22. In the embodiment shown in FIGS. 1–3, the traversing means comprises an elongated guide beam 30 and a crosshead 32 slidably mounted on the guide beam 30. Crosshead 32 and guide beam 30 act as a translational bearing having an axis of translation 34 oriented substantially horizontally and perpendicular to track 4 as seen in FIGS. 1 and 2. FIG. 3 shows a detailed view of crosshead 32 engaging guide beam 30, the guide beam having a toothed rack 36 which engages a pinion within the crosshead (not shown) rotatable by means of a pinion knob 38 enabling precise movement and positioning of crosshead 32 on guide beam 30 along the axis of translation 34.

Crosshead 32 is provided with a support structure 40 on which is mounted a first measurement means for measuring a distance to the catenary 2. In the embodiment shown in FIGS. 1–4, the first measurement means comprises a laser rangefinder 42 which is mounted on support structure 40 by means of a clamping bracket 44 extending from support structure 40 and engaging a rib 46 extending from rangefinder 42 (see FIG. 4). Rangefinder 42 is oriented to project a laser beam 56 substantially normally to platform 22 toward catenary 2 and measures the distance to the catenary by measuring the time it takes for the beam to travel from the rangefinder to the catenary and reflect back to the rangefinder. Knowing this time duration and the speed of light in air, the distance to the catenary can be calculated by multiplying the speed of light by half of the time duration. This procedure is more fully explained below in conjunction with the method of using the apparatus.

Mounting rangefinder 42 on the traversing means comprising the crosshead 32 and guide beam 30 allows the rangefinder 42 to be traversed relatively to platform 22 in a vertically oriented imaginary plane 48 which extends transversely and perpendicularly of track 4 as illustrated in FIG. 1. A second measurement means is provided to measure the displacement of the rangefinder 42 relative to platform 22 within the plane 48. The second measurement means is illustrated in FIG. 3 which shows a graduated scale 50 on guide beam 30 and a reference scale 52 on the crosshead 32. The scales 50 and 52 comprise a translational measuring means and by noting the initial and final positions of the crosshead reference scale 52 relative to the graduated scale 50 it is possible to measure the displacement of the rangefinder 42 relative to platform 22.

The embodiment illustrated in FIGS. 1–3 also has a calculating means operatively associated with apparatus 20. Preferably, the calculating means comprises a portable digital computer 54 which can be used to record measurement data taken by the apparatus and to perform calculations with the data, for example, calculating the height H and stagger S of the catenary relative to reference point 14 at a predetermined location along track 4. Computer 54 is preferably directly linked to rangefinder 42 via a cable 55 to record measurements made by the rangefinder automatically. Laser rangefinders manufactured by the Leica Corporation are currently sold under the trademark name DISTO which have the capability to directly interface as shown with portable computers, especially "personal digital assistant" type computers such as those sold under the APPLE NEWTON trademark.

The above described embodiment is used to measure the height and stagger of the catenary 2 according to the general flow chart illustrated in FIG. 14 and in detail as follows. Platform 22 is supported on track 4 via flanged wheels 26 at a first predetermined location along track 4. Odometer 28 is preferably set to zero via resetting knob 29. Preferably, legs 24 support platform 2 so that the zero marking on the graduated scale 50 is positioned at a known constant distance directly above reference point 14 located at the center of track 4 at the first predetermined location. Crosshead 32 is initially positioned so that the zero mark on reference scale 52 is aligned with the zero mark of graduated scale 50. Rangefinder 42 is positioned on support structure 40 such that laser beam 56 is aligned with the zero mark on reference scale 52. Thus, when the zero marks on scales 52 and 50 are aligned, a line collinear with beam 56, when extended downwardly, will intersect point 14 and bisect track 4.

After positioning apparatus 20 at the predetermined location for the measurement, the operator traverses the rangefinder 42 along guide beam 30 to align laser beam 56 with contact wire 10. An optical sight 58 conveniently mounted to rangefinder 42 is used to align laser beam 56 with contact wire 10 as follows. Sight 58 has a reflecting mirror 60 which reflects an overhead image into eyepiece 62. An operator peers into eyepiece 62 and rotates pinion knob 38 which turns the pinion (not shown) which engages toothed rack 36 forcing crosshead 32 to move along guide beam 30 and thereby traversing rangefinder 42 along axis of translation 34 within imaginary plane 48. When the image of contact wire 10 is visible in the center of eyepiece 62 laser beam 56 will be aligned along a line of sight (LOS) with contact wire 10 as shown in FIG. 2. Aligning the beam 56 with contact wire 10 means that when beam 56 is projected upwardly from rangefinder 42 the beam will strike wire 10 and reflect back downwardly to the rangefinder.

After the traversing alignment, rangefinder 42 is used to measure the vertical distance from the rangefinder to contact wire 10. The operator pushes button 64 to project the beam 56 which passes upwardly through lens 66 atop rangefinder 42. Beam 56 hits contact wire 10 and a portion of the beam reflects back to the rangefinder and passes through lens 66 where the reflected laser light is sensed by sensing means within the rangefinder. Circuitry within the rangefinder measures the time period between when the laser beam was projected and when the reflected laser light was sensed and calculates the distance from the top of the rangefinder (43) to the target object (wire 10) using the measured time period and the known speed of light in air. This distance is displayed via a liquid crystal display 68 located in the side of rangefinder 42. Simultaneously with the display, an electrical signal is encoded with the distance information which is conveyed over cable 55 to computer 54 for direct input of the measurement information into the computer. The distance measurement made is not the height H but is proportional to the height; a correction must be made by adding the known vertical distance from point 14 to the top

(43) of the rangefinder. This can be conveniently done by the computer 54. The stagger is then measured directly by measuring the traversing displacement of the crosshead 32 on guide beam 30. The measurement is made by reading where the zero mark on reference scale 52 is relative to the zero mark on graduated scale 50. FIG. 3 illustrates a left stagger of 2.4 inches. This measurement is entered into computer 54 either by hand or automatically if a transducer is attached between the crosshead 32 and the guide beam 30 which encodes a signal proportional to the traversing displacement of crosshead 32. It is also convenient at this time to enter the odometer reading into the computer 54, so that the computer 54 stores the height and stagger of the catenary relative to reference point 14 at the first predetermined location along track 4 designated by the odometer reading, in this example, zero, since the odometer 28 was reset to provide a starting point for the measurements.

Further height and stagger measurements can be made at other predetermined locations along track 4, preferably by moving apparatus 20 along track 4 on flanged wheels 26, odometer 28 measuring the distance moved along track 4. When apparatus 20 is positioned at the next predetermined location (defined by the odometer reading indicating a predetermined distance travelled for example) the steps for measuring height and stagger described above are repeated except of course the odometer is not reset to zero. In this way the height H and stagger S of the catenary 2 can be mapped over a predetermined length of track 4.

FIGS. 7–10 illustrate a second embodiment of a catenary measuring apparatus 20a according to the invention. Apparatus 20a has many of the same or analogous features, as described above, for apparatus 20, and the same numbering scheme is used to describe apparatus 20a as was used for apparatus 20 with the letter "a" appended throughout to the reference characters to distinguish between embodiments.

Apparatus 20a comprises a platform 22a supported on track 4 via support legs 24a and flanged wheels 26a. Flanged wheels 26a are rotatably mounted to legs 24a in a manner similar to wheels 26, and an odometer 28a is operationally associated with one of the wheels 26a. Wheels 26a provide mobility to apparatus 20a along track 4 and odometer 28a is used to measure the distance apparatus 20a travels along the track.

Figure 9:
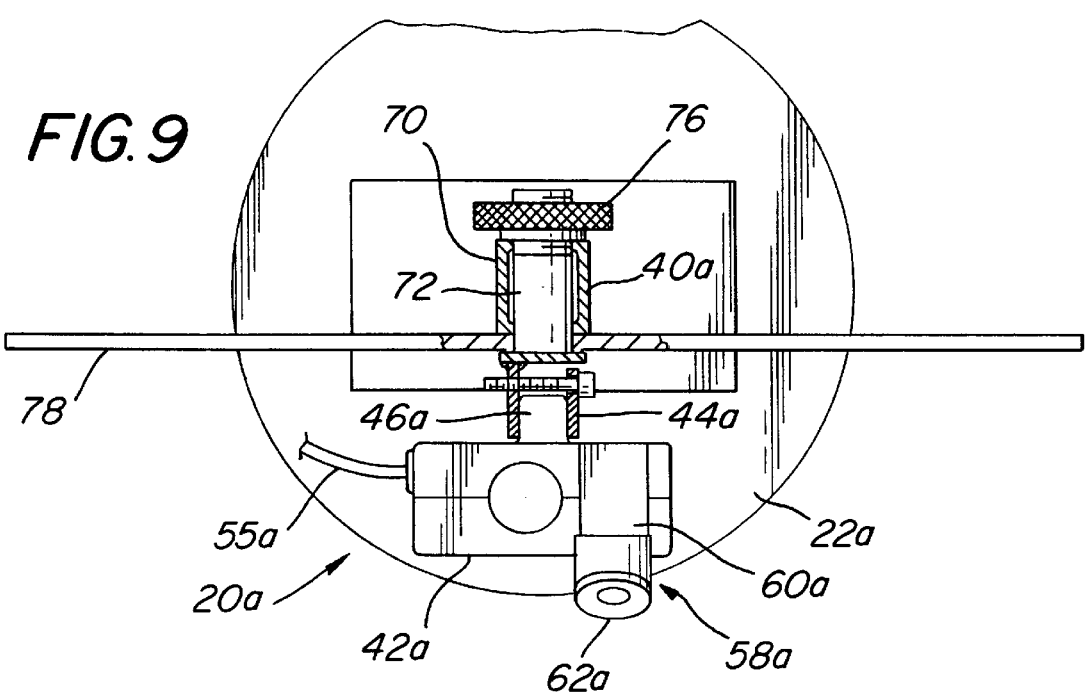
FIG. 9 shows a plan view of a portion of the second embodiment of FIG. 7.
Figure 10:
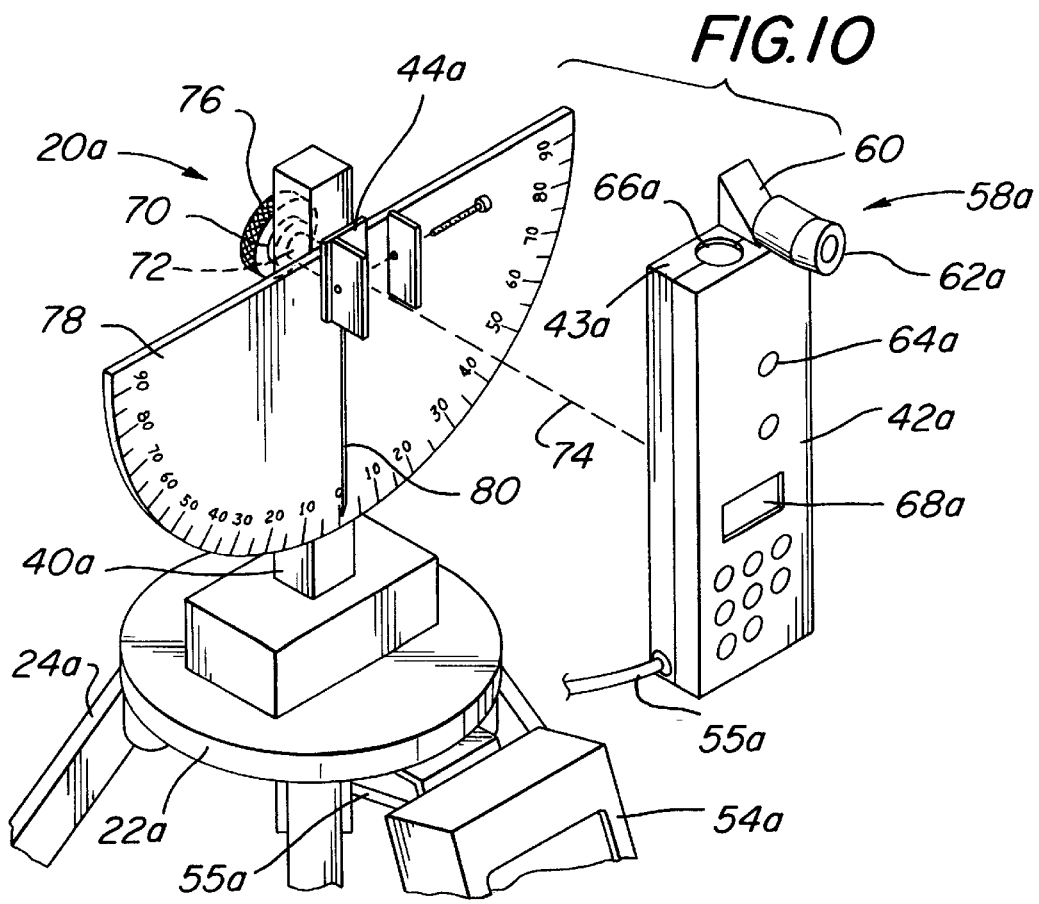
FIG. 10 shows an isometric exploded view of a portion of the second embodiment of FIG. 7.

Apparatus 20a further comprises a support structure 40a, best seen in FIGS. 8 and 10, which houses a traversing means comprising a rotational bearing 70 supporting a rotatable shaft 72 (both seen in FIG. 9). Bearing 70 and shaft 72 have an axis of rotation 74 (illustrated in FIG. 10) oriented substantially horizontally and parallel to track 4. Shaft 72 is attached to a clamping bracket 44a which attaches to a rib 46a extending from rangefinder 42a (FIG. 9), thus providing a means for rotatably mounting rangefinder 42a to apparatus 20a. Rangefinder 42a can thus be angularly traversed in a displacement about rotational axis 74 via shaft 72 rotating within bearing 70. Rangefinder 42a can be conveniently held in a given angular position by tightening jam wheel 76 which is threadedly mounted on the end of shaft 72 and operates to frictionally lock the shaft and prevent its rotation by forcibly drawing clamping bracket 44a against protractor scale 78 (described below) when jam wheel 76 is tightened.

An angular measurement means in the form of a protractor scale 78 is preferably fixedly attached to support structure 40a and interposed between rangefinder 42a and the support structure. As seen in FIG. 10, an indicator needle 80 is attached to clamping bracket 44a and rotates when rangefinder 42a is rotated, indicator needle 80 being used in conjunction with protractor scale 78 to measure the angular displacement of rangefinder 42a within plane 48.

As seen in FIGS. 7 and 8 rangefinder 42a is oriented to project its laser beam 56a radially away from axis of rotation 74 and the rangefinder rotationally traverses within the vertically oriented imaginary plane 48 which extends transversely and perpendicularly of track 4 as illustrated in FIG. 7. The rangefinder is positioned on the apparatus 20a bisecting track 4 such that when laser beam 56a is projected perpendicular to platform 22a the beam travels along a line which, when extended downwardly, passes through reference point 14.

Apparatus 20a also has a calculating means operatively associated with it, preferably in the form of a portable digital computer 54a, which preferably works in conjunction with rangefinder 42a via cable 55a to transfer measurements made by the rangefinder directly to the computer as in the previous embodiment.

Figure 14:
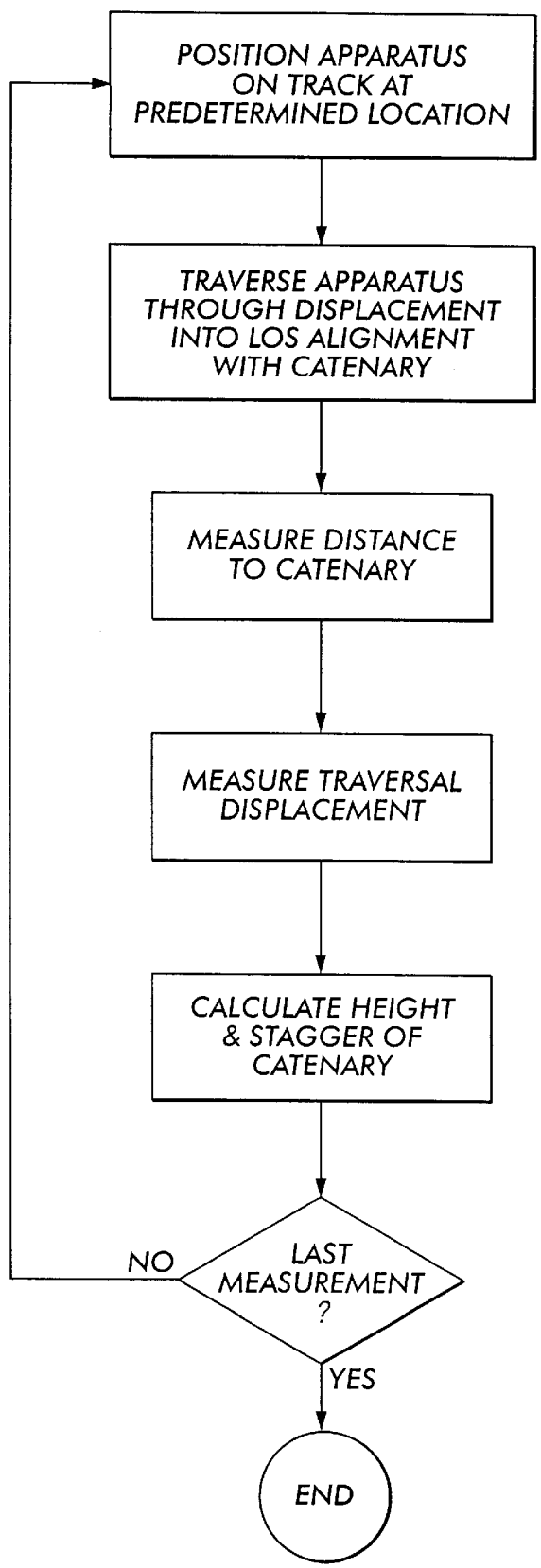
FIG. 14 shows a flow chart describing the method of catenary measurement according to the invention.

In operation apparatus 20a is used to measure height and stagger of a catenary 2 relative to a reference point 14 on track 4 basically according to the flow chart illustrated in FIG. 14. In detail, apparatus 20a is positioned on track 4 at a predetermined location where a measurement is to be made; for example, the location shown in FIG. 7. The odometer reading from odometer 28a is noted and recorded providing a reference point for the measurement along track 4. Rangefinder 42a is next traversed through an angular displacement 82 within the imaginary plane 48 until the image of contact wire 10 reflected in mirror 60a is visible in the center of eyepiece 62a of optical sight 58a. The traversal brings the laser beam into a line of sight (LOS) alignment with contact wire 10. The rangefinder is then locked in this angular orientation by tightening jam wheel 76, and the LOS distance 84 from the rangefinder to the contact wire 10 is measured by pressing button 64a which projects the beam 56a and activates the internal circuitry within the rangefinder which calculates the distance, displays the distance on LCD 68a and encodes the LOS distance measurement and transfers it to computer 54a. The LOS distance 84 is not the height H as can be seen in FIG. 7, but LOS distance 84 represents the length of the hypotenuse of a triangle whose long leg 86 represents the vertical height from the top 43a of rangefinder 42a to the contact wire and whose short leg 88 represents the perpendicular distance from the long leg 86 to the contact wire 10. Long leg 86 and short leg 88 are related to the LOS distance 84 by the trigonometric functions of cosine and sine, respectively, of angle 82 as measured on protractor scale 78 by indicator needle 80. Once the LOS distance 84 and angle 82 are fed into computer 54a, it calculates the height H and stagger S using these values and the known position of rangefinder 42a above reference point 14.

Apparatus 20a is then moved along track 4 to another predetermined location and the measurement steps are repeated, thus creating a map of the height and stagger of the catenary 2 which is correlated with the odometer readings to provide a survey of the catenary along a predetermined length of track 4.

Figure 11:
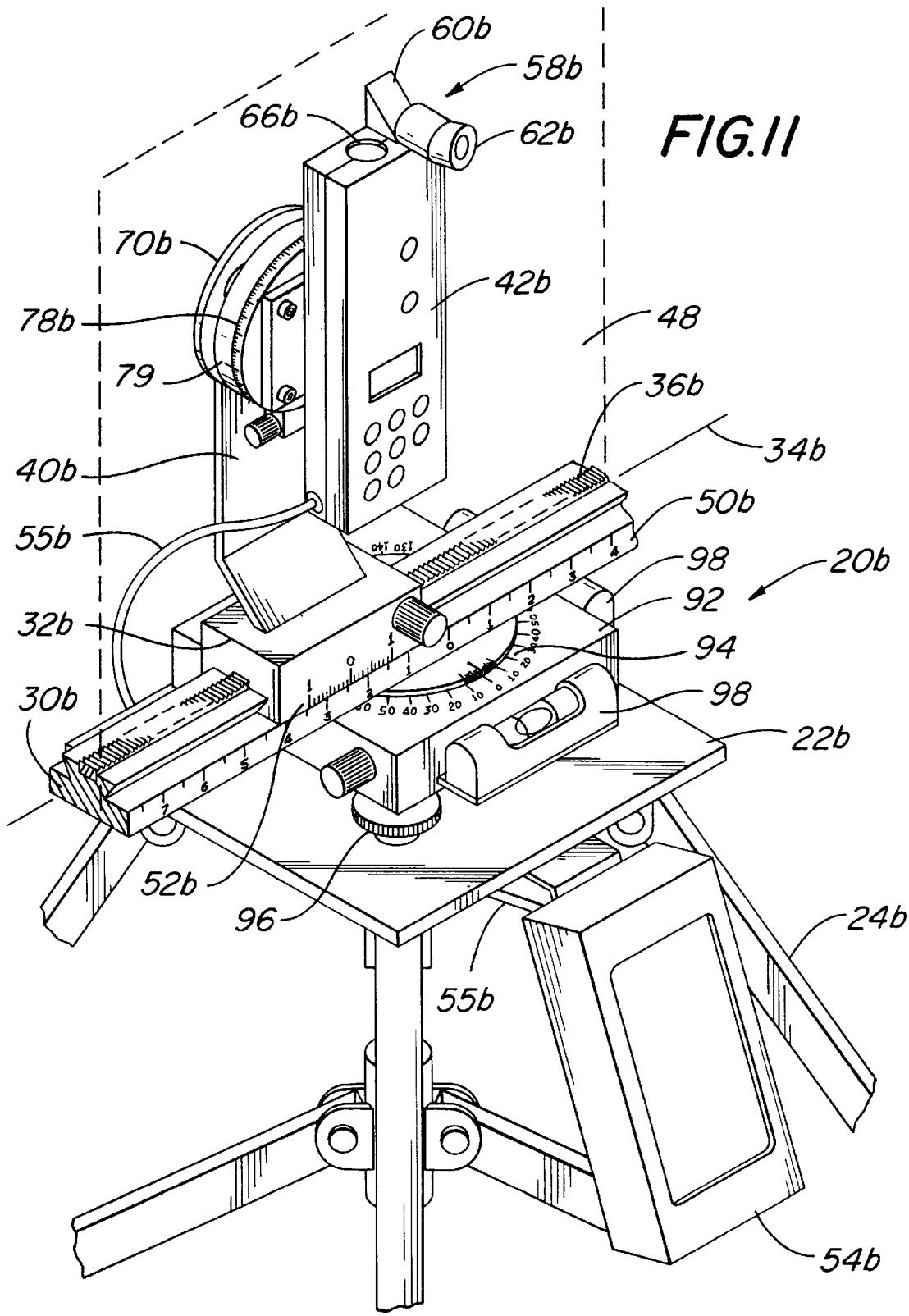
FIG. 11 shows an isometric view of a portion of a third embodiment of the apparatus according to the invention.
Figure 12:
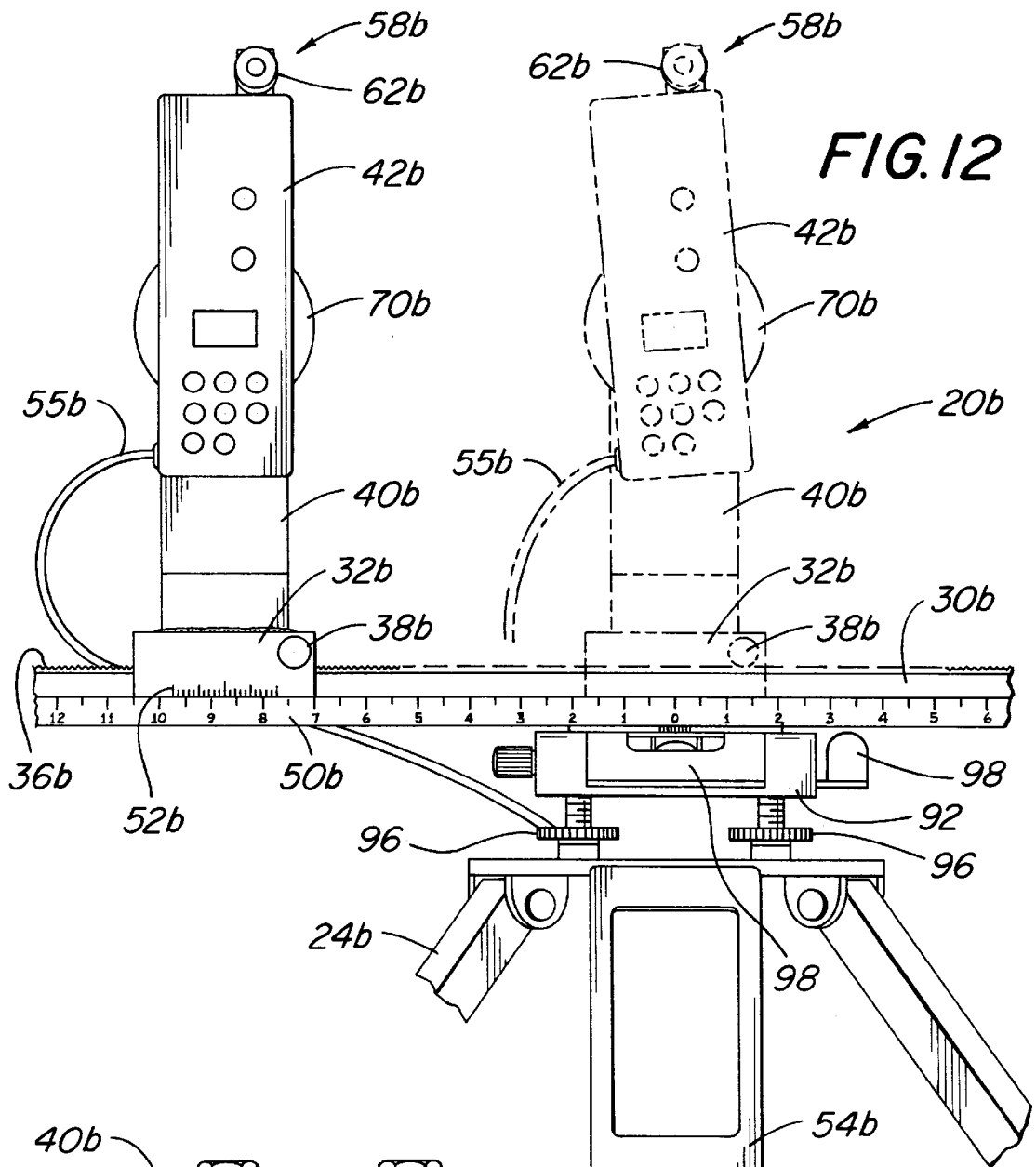
FIG. 12 shows an end elevation of a portion of the third embodiment of FIG. 11.
Figure 13:
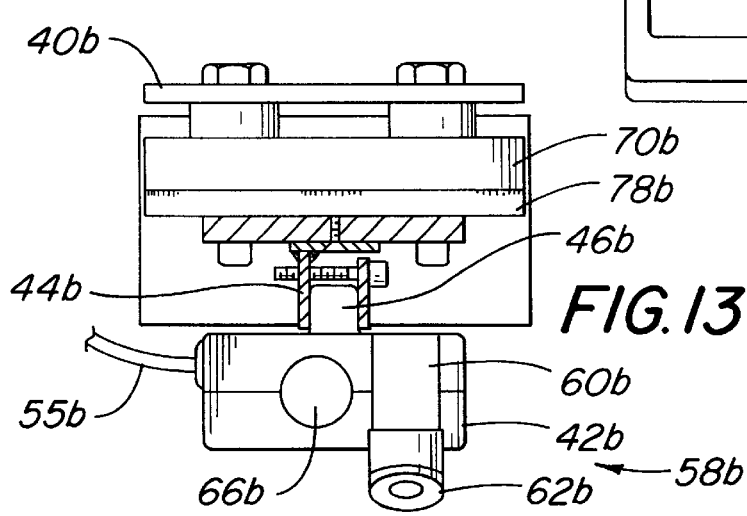
FIG. 13 shows a plan view of a detail of the embodiment of FIG. 11.

A third embodiment of the apparatus 20b for measuring the height and stagger of a catenary above a track is illustrated in FIGS. 11–13. As seen in FIG. 11, embodiment 20b comprises a platform 22b supported on support legs 24b. Embodiment 20b also incorporates the traversal means of both embodiments 20 and 20a. Rangefinder 42b is mounted on a rotational bearing 70b allowing rotational traversal of the rangefinder within the imaginary plane 48 (shown in phantom line in FIG. 12), and rotational bearing 70b is, in turn, mounted on a cross head 32b slidably mounted on an extended beam 30b having an axis of translation 34b allowing rangefinder 42b to translationally traverse within the imaginary plane 48, as seen in solid line in FIG. 12. Measurement means are again provided in the form of a protractor scale 78b which rotates relative to the fixed reference mark 79 when rangefinder 42b is rotated to measure the elevational angular traversal of the rangefinder. Graduated scale 50b and reference scale 52b are also provided to measure the translational traversal of the rangefinder on the crosshead 32b as described previously for the first embodiment. Thus height and stagger measurements can be made by either or combinations of both means heretofore described. It may be desirable on occasion to first translate rangefinder 42b relative to platform 22b and then rotate the rangefinder into a LOS alignment with a contact wire. This may be necessary, for example, if another wire is blocking the LOS from the rangefinder, and moving the rangefinder laterally allows an unobstructed LOS to the target wire. Computer 54b is programmed to calculate the height H and stagger S given the angular and lateral traversal measurements and the known height and position of the platform 22b above the reference point 14.

Unlike the previous embodiments 20 and 20a, the embodiment shown in 20b includes the capability of azimuthal rotation of the rangefinder, that is, rotation about a vertical axis 90. Azimuthal rotation is provided by a second rotational bearing 92 having an axis of rotation vertically oriented. A second protractor scale 94 is also provided permitting measurement of the azimuthal rotation of the rangefinder. Rotational bearing 92 is preferably mounted to platform 22b via leveling screws 96 which can be turned to level rotational bearing 92 relative to platform 22b using bubble levels 98. Leveling the bearing 92 ensures the utmost accuracy of measurements taken by the apparatus by eliminating small errors of angle and alignment which are not compensated for in the computer calculations.

As seen in FIG. 13 rangefinder 42b is attached to rotational bearing 70b by means of a clamping bracket 44b which engages rib 46b on the rangefinder.

Figure 15:
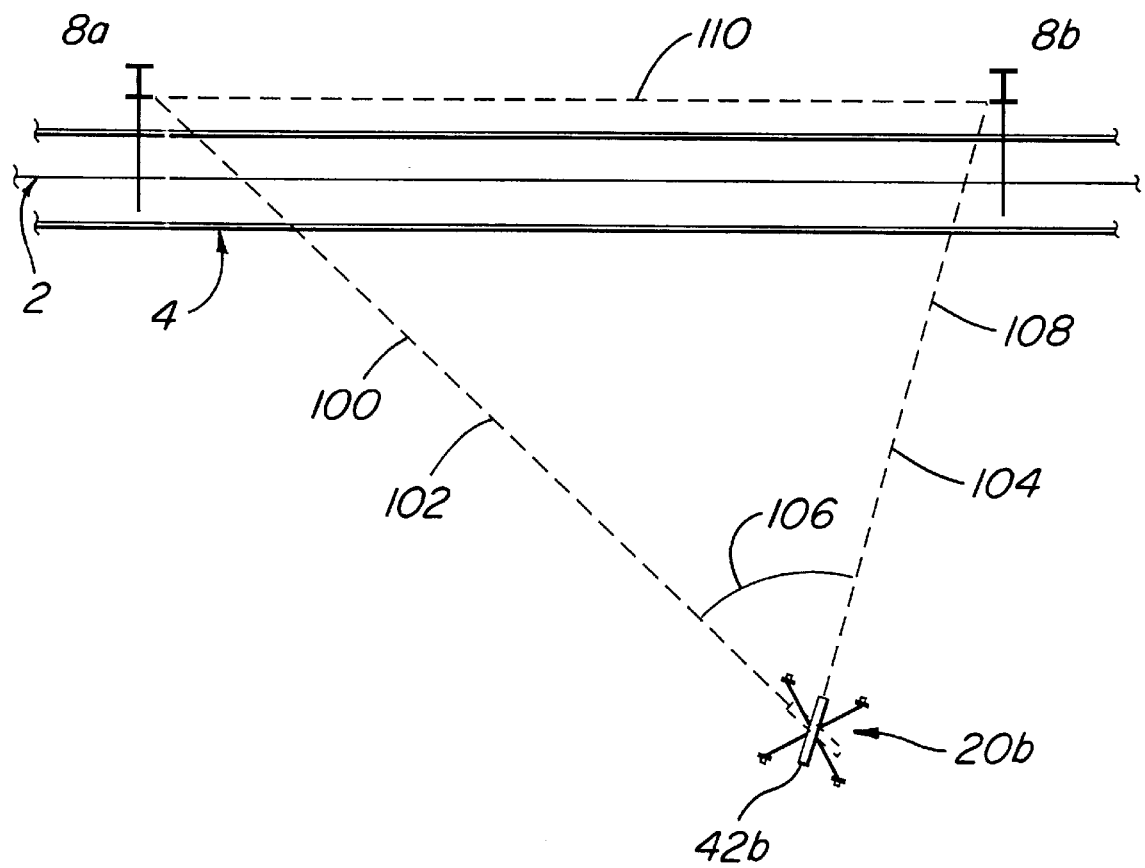
FIG. 15 shows a plan view of a measurement of a distance between two points made using the embodiment of FIG. 11.

When apparatus 20b is not rotated in azimuth, as shown in FIG. 11, the traversals of rangefinder 42b, whether rotational or translational, are confined to imaginary plane 48. However, azimuthal rotation of the rangefinder allows traversal outside of the plane and permits measurements other than height and stagger to be conveniently made. For example, as illustrated in FIG. 15, the distance between two catenary support columns 8a and 8b can be measured by positioning apparatus 20b at a fixed point somewhere between the two columns. Next, the rangefinder is rotated in elevation on bearing 70b until the laser beam will be projected horizontally. Then, the rangefinder is arbitrarily rotated in azimuth on bearing 92 into a first LOS 100 with column 8a. The rangefinder is used to measure the LOS distance 102 from the fixed point to column 8a. Rangefinder 42b is then rotated in azimuth into a second LOS alignment 104 with column 8b, the azimuthal angular rotation 106 is measured on azimuthal protractor scale 94, and a second LOS distance 108 is measured to the other column via the rangefinder. Knowing the LOS distances from the fixed position of apparatus 20b to each column 8a and 8b and the azimuthal angle 106 between the respective lines of sight to each column, one can calculate the distance 110 between the columns using the law of sines or cosines. Computer 54b is easily programmed with these relatively simple trigonometric functions and can provide rapid calculation of distance 110. Other more complicated algorithms can also be programmed, allowing measurements to be made in three dimensions between any two points within range of the laser by measuring the distance to each point from a fixed point and measuring the azimuthal and elevational angles between the lines of sight to those two points from the single fixed point of measurement.

I claim:

1. Apparatus for determining height and stagger of a railway catenary relative to a predetermined reference point located on a railway track at a predetermined location along the track, the track being disposed beneath the catenary, said apparatus comprising:

a platform supported on the track at the predetermined location, said platform being positioned at a predetermined position relatively to the predetermined reference point;

first measurement means for measuring a distance to the catenary, said distance being proportional to the height;

traversing means for said first measurement means, said traversing means being mounted on said platform and supporting said first measurement means for movement relatively to said platform in a vertically oriented plane extending transversely and perpendicularly of the track; and second measurement means for measuring displacements of said first measurement means in said plane, said displacements being proportional to the stagger.

2. Apparatus according to claim 1, wherein the reference point is located on the centerline of the track at the top of the rails.

3. Apparatus according to claim 1, wherein said first measurement means comprises a laser rangefinder having means for projecting a projected laser light beam at the catenary and for detecting a reflected laser light beam reflecting from the catenary, and means for determining said distance to the catenary using said projected and reflected laser light beams.

4. Apparatus according to claim 3, wherein said traversing means comprises:

a translational bearing having an axis of translation oriented substantially horizontally and perpendicularly to the track;

mounting means for mounting said rangefinder on said translational bearing for translational movement along said axis, said rangefinder being oriented to project said projected beam substantially normal to said platform; and said second measurement means comprises translational measurement means mounted on said platform for measuring said translational movement of said rangefinder.

5. Apparatus according to claim 4, wherein said translational bearing comprises an elongated guide beam mounted atop said platform and oriented perpendicularly to the track, and a crosshead mounted on said guide beam, said crosshead having means for movably engaging said guide beam for lateral displacement of said crosshead along said guide beam relatively to said platform, said crosshead further having said mounting means for mounting said rangefinder on said crosshead.

6. Apparatus according to claim 4 further comprising a calculating means operatively associated with said apparatus for calculating the height and stagger of the catenary at the predetermined location along the track using said distance, said translational movement, the predetermined reference point, and the predetermined position of said platform relatively to the predetermined reference point.

7. Apparatus according to claim 4 further including movable support means for movement of said platform along the track.

8. Apparatus according to claim 7, wherein said movable support means comprises a plurality of flanged wheels engaging the track, said flanged wheels being rotatably mounted on said platform.

9. Apparatus according to claim 8 having a third measurement means for measuring movement of said platform along the track.

10. Apparatus according to claim 9, wherein said third measurement means comprises an odometer operatively engaged with one of said wheels.

11. Apparatus according to claim 3, wherein said traversing means comprises:

a rotational bearing having an axis of rotation oriented substantially horizontally and parallel to the track, said bearing having support means for said rangefinder for rotation about said axis, said rangefinder being oriented to project said projected beam radially from said axis;

a bearing support structure mounting said bearing on said platform;

said displacements comprise an angular displacement of said rangefinder about said axis; and said second measurement means comprises angular measurement means mounted on said platform for measuring said angular displacement of said rangefinder.

12. Apparatus according to claim 11 further comprising a calculating means operatively associated with said apparatus for calculating the height and stagger of the catenary at the predetermined location along the track using said distance, said angular displacement, the predetermined reference point, and the predetermined position of said platform relatively to the predetermined reference point.

13. Apparatus according to claim 11 further including movable support means for movement of said platform along the track.

14. Apparatus according to claim 13, wherein said movable support means comprises a plurality of flanged wheels engaging the track, said flanged wheels being rotatably mounted on said platform.

15. Apparatus according to claim 14 having a third measurement means for measuring movement of said platform along the track.

16. Apparatus according to claim 15, wherein said third measurement means comprises an odometer operatively engaged with one of said wheels.

17. Apparatus according to claim 11 further comprising first and second movable means interposed between said support structure and said platform for movably mounting said support structure, and thereby said rangefinder, on said platform, said support structure being mounted on said first movable means, said first movable means being mounted on said second movable means, said second movable means being mounted on said platform.

18. Apparatus according to claim 17, wherein one of said first and second movable means comprises a second rotational bearing having a second axis of rotation oriented substantially normal to said platform, said second rotational bearing for rotating said support structure, and thereby said rangefinder, about said second axis; and an other of said first and second movable means comprises a translational bearing having an axis of translation oriented substantially horizontally, said translational bearing for laterally moving said support structure, and thereby said rangefinder, along said axis of translation.

19. Apparatus according to claim 18 further comprising azimuthal measurement means for measuring a second angular displacement of said rangefinder, said second angular displacement being about said second axis of rotation.

20. Apparatus according to claim 19 further comprising lateral measurement means for measuring translational motion of said rangefinder along said axis of translation.

21. Apparatus according to claim 20 further including movable support means for movement of said platform along the track.

22. Apparatus according to claim 21, wherein said movable support means comprises a plurality of flanged wheels engaging the track, said wheels being rotatably mounted on said platform.

23. Apparatus according to claim 22 having a platform motion measurement means for measuring movement of said platform along the track.

24. Apparatus according to claim 23, wherein said platform motion measurement means comprises an odometer operatively engaged with one of said wheels.

25. A method for determining height and stagger of a railway catenary relative to a predetermined reference point located on a railway track disposed beneath the catenary, the reference point being at a predetermined location along the track, said method comprising the steps of:

positioning a measurement apparatus on the track at a predetermined position relatively to the predetermined reference point at the predetermined location along the track;

traversing said measurement apparatus to effect a displacement into an alignment along a line of sight with the catenary, said displacement being confined within a vertical plane oriented perpendicularly to the track;

measuring a distance from said measurement device to the catenary along said line of sight;

measuring said displacement of said measurement apparatus within said vertical plane;

calculating the height and stagger of the catenary using said distance, said displacement, and the predetermined position.

26. A method according to claim 25, wherein said traversing step comprises traversing said measurement apparatus in a lateral displacement perpendicular to the track, said lateral displacement bringing said measurement apparatus into said alignment directly beneath the catenary;

said distance measuring step comprises measuring said distance along said line of sight oriented substantially normal to the track; and said displacement measuring step comprises measuring said lateral displacement of said measurement apparatus.

27. A method according to claim 25, wherein said traversing step comprises traversing said measurement apparatus in an angular displacement about a horizontally oriented rotational axis disposed parallel to the track, said angular displacement bringing said measurement apparatus into said alignment with the catenary;

said distance measuring step comprises measuring said distance along said line of sight angularly displaced relative to the track; and said displacement measuring step comprises measuring said angular displacement of said measurement apparatus.

28. A method according to claim 25, wherein said distance measuring step comprises the steps of:
- projecting a projected laser beam at a predetermined velocity from said measurement apparatus along said line of sight to the catenary;
- detecting a reflected laser beam reflected from the catenary back to said measurement apparatus at said predetermined velocity;
- measuring a time period between when said projected laser beam is projected and when said reflected laser beam is detected; and
- calculating said distance using said time period and said predetermined velocity.

29. A method according to claim 25 further comprising the step of repeating the steps of positioning, traversing, measuring distance, measuring displacement, and calculating at a plurality of predetermined locations along a predetermined length of track, thereby determining the height and stagger of the catenary relative to a plurality of predetermined reference points, each predetermined reference point being at one of said plurality of predetermined locations along the predetermined length of track.

30. A method according to claim 29, wherein said positioning step comprises the steps of moving said measurement apparatus along the predetermined length of track to each of said plurality of predetermined locations.

31. A method of mapping the height and stagger of a railway catenary at a plurality of predetermined locations along a predetermined length of track, the height and stagger being determined relative to a plurality of respective predetermined reference points positioned on the track, one reference point being at each of the plurality of predetermined locations along the predetermined length of track, said method comprising the steps of:
- positioning a measurement apparatus on the track at a first predetermined location of the plurality of predetermined locations along the track, said measurement apparatus being positioned at a first predetermined position relatively to a first predetermined reference point of the plurality of the respective predetermined reference points;
- traversing said measurement apparatus to effect a first displacement into a first alignment along a first line of sight between said measurement apparatus and the catenary, said first displacement being confined within a first vertical plane oriented perpendicularly to the track at the first predetermined location of the plurality of predetermined locations along the track;
- measuring a first distance from said measurement device to the catenary along said first line of sight;
- measuring said first displacement of said measurement apparatus;
- calculating the height and stagger of the catenary at the first predetermined location using said first distance, said first displacement, and said first predetermined position;
- positioning said measurement apparatus on the track at a second predetermined location of the plurality of predetermined locations along the track, said measurement apparatus being positioned at a second predetermined position relatively to a second predetermined reference point of the plurality of the respective predetermined reference points;
- traversing said measurement apparatus to effect a second displacement into a second alignment along a second line of sight between said measurement apparatus and the catenary, said second displacement being confined within a second vertical plane oriented perpendicularly to the track at the second predetermined location of the plurality of predetermined locations along the track;
- measuring a second distance from said measurement device to the catenary along said second line of sight;
- measuring said second displacement of said measurement apparatus;
- calculating the height and stagger of the catenary at said second predetermined location using said second distance, said second displacement, and said second predetermined position; and
- repeating said positioning, displacing, measuring, and calculating steps for each predetermined location along the predetermined length of track.

32. A method according to claim 31 further comprising the step of positioning said measurement apparatus at the second predetermined location by moving said measurement apparatus along the track from the first predetermined location to the second predetermined location.

33. A method according to claim 31, wherein said traversing step comprises traversing said measurement apparatus substantially horizontally and perpendicularly to the track, thereby bringing said measurement apparatus into each of said alignments directly beneath the catenary; and
- said distance measuring step comprises measuring said distance along each of said lines of sight in a direction substantially normal to the track.

34. A method according to claim 31, wherein said traversing step comprises traversing said measurement apparatus in each of said displacements through an angle about an axis of rotation oriented substantially horizontally and parallel to the track, thereby bringing said measurement apparatus into each of said alignments with the catenary; and
- said distance measuring step comprises measuring said distance along each of said lines of sight angularly displaced relative to the track.

35. A method according to claim 31, wherein said distance measuring step at each predetermined location along the predetermined length of track comprises the steps of:
- projecting a projected laser beam at a predetermined velocity from said measurement apparatus along a respective line of sight to the catenary;
- detecting a reflected laser beam reflected from the catenary back to said measurement apparatus at said predetermined velocity;
- measuring a time period between when said projected laser beam is projected and when said reflected laser beam is detected; and
- calculating said distance using said time period and said predetermined velocity.

* * * * *